US010693770B2

(12) United States Patent
Moisand et al.

(10) Patent No.: US 10,693,770 B2
(45) Date of Patent: *Jun. 23, 2020

(54) SERVICE CHAINING WITHIN COMPUTER NETWORKS

(71) Applicant: Juniper Networks, Inc., Sunnyvale, CA (US)

(72) Inventors: Jerome P. Moisand, Arlington, MA (US); Julius W. Francis, Boxborough, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 147 days.

This patent is subject to a terminal disclaimer.

(21) Appl. No.: 15/694,588

(22) Filed: Sep. 1, 2017

(65) Prior Publication Data

US 2017/0366452 A1    Dec. 21, 2017

Related U.S. Application Data

(63) Continuation of application No. 14/042,685, filed on Sep. 30, 2013, now Pat. No. 9,755,960.

(51) Int. Cl.
| | | |
|---|---|---|
| *H04L 12/725* | (2013.01) | |
| *H04L 12/46* | (2006.01) | |
| *H04L 29/08* | (2006.01) | |

(52) U.S. Cl.
CPC ........ *H04L 45/30* (2013.01); *H04L 12/4633* (2013.01); *H04L 67/02* (2013.01);
(Continued)

(58) Field of Classification Search
CPC ....... H04L 45/30; H04L 67/142; H04L 67/02; H04L 67/146; H04L 12/4633
See application file for complete search history.

(56) References Cited

U.S. PATENT DOCUMENTS

| 6,173,325 B1 | 1/2001 | Kukreja |
| 6,952,428 B1 | 10/2005 | Necka et al. |

(Continued)

FOREIGN PATENT DOCUMENTS

| CN | 1674497 A | 9/2005 |
| CN | 102360295 A | 2/2012 |

(Continued)

OTHER PUBLICATIONS

Final Office Action from U.S. Appl. No. 14/228,706, dated Sep. 4, 2018, 36 pp.

(Continued)

*Primary Examiner* — Min Jung
(74) *Attorney, Agent, or Firm* — Shumaker & Sieffert, P.A.

(57) ABSTRACT

Techniques are described for providing session-aware, stateful network services to subscriber packet flows. Devices within a service provider network direct subscriber packets along service chains. Each tunnel is established to direct traffic according a particular ordered set of network services for the corresponding service chain. An ingress device for the tunnels encapsulate the subscriber packets and embed opaque session cookies that each uniquely identifies a collection of packet flows of a subscriber session amongst other packet flows transported by a given service tunnel. Each service node need only identify the tunnel on which a tunnel packet was received and the session cookie embedded within the tunnel packet to uniquely associate the encapsulated subscriber packet with a subscriber session, without needing to further inspect the encapsulated subscriber packet, and to index or otherwise retrieve state and statistics required to enforce the network service the service nod is programmed to deliver.

22 Claims, 7 Drawing Sheets

(52) U.S. Cl.
CPC .......... *H04L 67/142* (2013.01); *H04L 67/146* (2013.01); *H04L 67/1027* (2013.01)

(56) References Cited

U.S. PATENT DOCUMENTS

| | | | |
|---|---|---|---|
| 7,082,464 B2 | 7/2006 | Hasan et al. | |
| 7,092,397 B1 | 8/2006 | Chandran et al. | |
| 7,184,437 B1 | 2/2007 | Cole et al. | |
| 7,200,662 B2 | 4/2007 | Hasan et al. | |
| 7,215,637 B1 | 5/2007 | Ferguson et al. | |
| 7,254,634 B1* | 8/2007 | Davis | G06F 11/203 709/227 |
| 7,376,718 B2 | 5/2008 | Gould et al. | |
| 7,616,625 B1* | 11/2009 | Un | H04L 12/2859 370/247 |
| 7,697,429 B2 | 4/2010 | Godlewski | |
| 7,894,445 B2 | 2/2011 | Godas et al. | |
| 7,948,883 B1 | 5/2011 | Croft et al. | |
| 7,990,993 B1 | 8/2011 | Ghosh et al. | |
| 8,023,478 B2 | 9/2011 | Cam-Winget et al. | |
| 8,050,559 B2 | 11/2011 | Sindhu | |
| 8,112,800 B1 | 2/2012 | Yang et al. | |
| 8,266,264 B2 | 9/2012 | Hasan et al. | |
| 8,369,345 B1* | 2/2013 | Raghunathan | H04L 45/60 370/397 |
| 8,370,528 B2 | 2/2013 | Bryers et al. | |
| 8,605,655 B1 | 12/2013 | Sahai et al. | |
| 8,615,009 B1 | 12/2013 | Ramamoorthi et al. | |
| 8,693,374 B1 | 4/2014 | Murphy et al. | |
| 8,713,627 B2 | 4/2014 | Varadhan et al. | |
| 8,750,288 B2 | 6/2014 | Nakil et al. | |
| 8,806,058 B1 | 8/2014 | Mackie et al. | |
| 8,830,834 B2 | 9/2014 | Sharma et al. | |
| 8,837,479 B1 | 9/2014 | Kumar et al. | |
| 8,953,623 B1 | 2/2015 | Eyada | |
| 8,995,305 B2 | 3/2015 | Shaik et al. | |
| 9,014,191 B1 | 4/2015 | Mandal et al. | |
| 9,036,476 B2 | 5/2015 | Grandhi et al. | |
| 9,100,285 B1 | 8/2015 | Choudhury et al. | |
| 9,191,366 B2 | 11/2015 | Varadhan et al. | |
| 9,246,800 B1 | 1/2016 | Ramamoorthi et al. | |
| 9,258,237 B1 | 2/2016 | Smith et al. | |
| 9,258,742 B1 | 2/2016 | Pianigiani et al. | |
| 9,264,898 B2 | 2/2016 | Schroeder et al. | |
| 9,350,661 B2 | 5/2016 | Murphy et al. | |
| 9,596,169 B2 | 3/2017 | Choudhury et al. | |
| 9,608,908 B2* | 3/2017 | Yoshida | H04L 12/4666 |
| 9,686,198 B1 | 6/2017 | Smith et al. | |
| 9,755,960 B2 | 9/2017 | Moisand et al. | |
| 2003/0078038 A1 | 4/2003 | Kurosawa et al. | |
| 2006/0187942 A1 | 8/2006 | Mizutani et al. | |
| 2008/0044181 A1 | 2/2008 | Sindhu | |
| 2009/0323554 A1 | 12/2009 | Arisoylu et al. | |
| 2011/0113146 A1 | 5/2011 | Li et al. | |
| 2011/0170545 A1* | 7/2011 | Zheng | H04L 12/2856 370/392 |
| 2012/0002813 A1* | 1/2012 | Wei | H04L 63/0272 380/270 |
| 2013/0163594 A1 | 6/2013 | Sharma et al. | |
| 2013/0332602 A1 | 12/2013 | Nakil et al. | |
| 2014/0269293 A1 | 9/2014 | Patrick et al. | |
| 2015/0092551 A1 | 4/2015 | Moisand et al. | |
| 2015/0181459 A1 | 6/2015 | Zhu | |
| 2015/0207677 A1 | 7/2015 | Choudhury et al. | |
| 2015/0244617 A1 | 8/2015 | Nakil et al. | |
| 2015/0288738 A1* | 10/2015 | Chatterjee | H04B 7/1858 709/203 |

FOREIGN PATENT DOCUMENTS

| | | |
|---|---|---|
| CN | 103379494 A | 10/2013 |
| EP | 1624639 A1 | 2/2006 |
| EP | 2852109 A1 | 3/2015 |
| EP | 2854347 A2 | 4/2015 |
| WO | 2013184846 A1 | 12/2013 |

OTHER PUBLICATIONS

Office Action dated Jan. 25, 2018 in U.S. Appl. No. 14/228,706, 23 pp.

Response to Final Office Action dated Sep. 4, 2018, from U.S. Appl. No. 14/228,706, filed Nov. 5, 2018, 22 pp.

First Office Action and Search Report, and Summary, from counterpart Chinese Application No. 201410522688.X, dated Sep. 17, 2018, 6 pp.

Response to Office Action dated Jan. 25, 2018, from U.S. Appl. No. 14/228,706, filed Apr. 13, 2018, 18 pp.

Cablelabs et. al, Data-Over-Cable Service Interface Specifications, DOCSIS 3.0, MAC and Upper Layer Protocols Interface Specification, CM-SP-MULPIv3.0, Cable Television Laboratories, Inc., Louisville, CO., Aug. 3, 2007, 69 pp.

"3GPP TS 23.203—Policy and Charging Control Architecture (Release 10)" Version 10.1.0, 3rd Generation Partnership Project, Technical Specification Group Services and System Aspects, Sep. 2010, 132 pp.

"3GPP TS 29.212—Policy and Charging Control (PCC); Reference Points (Release 11)," Version 11.7.0, Feb. 2012, 196 pp.

"Enabling Service Chaining on Cisco Nexus 1000V Series Introduction White Paper," Cisco, Sep. 27, 2012, retrieved from http://www.cisco.com/c/en/us/products/collateral/switches/nexus-1000v-switch-vmware-vsphere/white_paper-C11-716028.pdf, 25 pp.

"Service Chaining," Juniper Networks, Sep. 16, 2013, retrieved from http://juniper.net/techpupbs/en_US/contrail1.0/topics/task/configuration/service-chaining-vinc.html, 3 pp.

Cablelabs et. al, Data-Over-Cable Service Interface Specifications, DOCSIS 1.1, Operations Support System Interface Specification, SP-OSSI-v1.1, Cable Television Laboratories, Inc., Louisville, CO., Mar. 12, 2003, 26 pp.

Cablelabs et. al, Data-Over-Cable Service Interface Specifications, DOCSIS 1.1, Operations Support System Interface Specification, SP-OSSI-v1.1, Cable Television Laboratories, Inc., Louisville, CO., Mar. 12, 003, 70 pp.

European Search Report from counterpart European Application No. 14185686.4, dated Mar. 13, 2015, 4 pp.

Fernando et al., "Virtual Topologies for Service Chaining in BGP/IP MPLS VPNs, draft-rfernando-13vpn-service-chaining-03," Internet-Draft, Oct. 18, 2013, 15 pp.

Kompella et al., Signaling Virtual Machine Activity to the Network Virtualization Edge, draft-kompella-nvo3-server2nve-02, Internet-Draft, Network Working Group, Apr. 29, 2013, 19 pp.

Patel et al., BGP vector routing, draft-patel-raszuk-bgp-vector-routing-03, Internet-Draft, Network Working Group, Apr. 21, 2014, 12 pp.

Response to European Office Action dated Apr. 20, 2015 from counterpart European application No. 14185686.4, filed Oct. 5, 2015, 2 pp.

Rosen et al., "BGP/MPLS IP Virtual Private Networks (VPNs)," RFC 4364, Network Working Group, Feb. 2006, 47 pp.

Intent to Grant and Text Intended to Grant from counterpart European Application No. 14185686.4, dated Feb. 16, 2016, 41 pp.

Intent to Grant and Text Intended to Grant from counterpart European Application No. 14185686.4, dated Jul. 21, 2016, 39 pp.

Decision to Grant from counterpart European Application No. 14185686.4, dated Aug. 11, 2016, 2 pp.

"Service Delivery Gateway—Addressing the Needs of Gi Networks in the Smartphone Revolution—Fact Sheet," 3000079-001-EN, Juniper Networks, Inc., Feb. 2011, 4 pp.

"Services Delivery Gateway Solution—Implementing IP Services and Mobile Video Optimization at the Mobile Packet Core," 7100142-002-EN, Juniper Networks, Inc., Aug. 2011, 151 pp.

U.S. Appl. No. 14/228,706, by Juniper Networks, Inc. (Inventors: Moisand et al.), filed Mar. 28, 2014.

Prosecution History from U.S. Appl. No. 14/042,685, dated Aug. 13, 2014 through May 18, 2017, 89 pp.

Prosecution History from U.S. Appl. No. 14/228,706, dated Jun. 16, 2016 through Jul. 11, 2017, 106 pp.

(56) References Cited

OTHER PUBLICATIONS

U.S. Appl. No. 15/005,726, by Juniper Networks, Inc. (Inventors: Ramamoorthi et al.), filed Jan. 25, 2016.

* cited by examiner

| | SERVICE CHAIN | HTTP FILTER | NAT | IDP | SBC | FIREWALL |
|---|---|---|---|---|---|---|
| 34A | 1 | | 1 | | | |
| 34B | 2 | 1 | 2 | | 3 | |
| 34C | 3 | 1 | | | | |
| 34D | 4 | 1 | | | | 2 |
| 34E | 5 | 1 | 2 | 3 | | |

FIG. 3

SERVICE CHAINING WITHIN COMPUTER NETWORKS

This application is a continuation of U.S. patent application Ser. No. 14/042,685 filed Sep. 30, 2013, the entire contents of which is incorporated herein by reference.

TECHNICAL FIELD

The disclosure relates to computer networks and, more specifically, to applying network services to data traffic traversing computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Routers include a control plane, sometimes called a management plane, which maintains the routing information, and a forwarding plane, which forwards received packets according to the routing information.

Network service providers provide services such as security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching. To provide these new services, service providers have often turned to specialized, dedicated appliances. In some cases, routers have been modified to include additional hardware or software that applies various services to the incoming packets. For example, line cards installed in a service plane of a router may be configured to perform particular services, such as the services described above.

Deploying dedicated appliances or custom hardware blades within existing routing infrastructure can be expensive and time consuming, thereby preventing service providers from quickly deploying hardware that supports new services. Deploying dedicated appliances increases operational costs because existing techniques often require many different custom devices interconnected and configured in a static manner, and provide little to no integration with the routers or other network elements.

SUMMARY

In general, techniques are described for providing session-aware, stateful network services to packet flows associated with subscriber sessions. For example, network systems are described in which service providers are able to leverage service complexes of service nodes for application of the network services using, for example, general purposes computing servers executing network services software. The techniques described herein facilitate the application of session-oriented services by allowing packet flows to easily be directed along "service chains," where each of the service chains represents an ordered set of stateful services applied by the service nodes.

Moreover, devices direct the subscriber packets along the service chains by tunneling the subscriber packets within corresponding traffic engineered tunnels, where each tunnel is established so as to direct traffic according to the particular ordered set of network services for the corresponding service chain. Devices that operate as ingresses to the tunnels encapsulate the subscriber packets. Moreover, the devices, such as gateway routers within the service provider network, embed the additional information in the form of opaque session cookies. In this way, each tunnel packet carries an opaque session cookie, and the contents of each session cookie uniquely identifies a collection of session-specific packet flows amongst other packet flows transported by the given service tunnel. As such, when receiving tunnel packets, each service node need only identify the service tunnel on which the tunnel packet was received and the session cookie embedded within the tunnel packet in order to uniquely associate the encapsulated subscriber packet with a subscriber session. The collection of packet flows associated with the same session cookie may uniquely identify all of the packet flows originating for a subscriber session, such all flows originating from a subscriber's access connection. Alternatively, a given session cookie need not represent all packet flows from the subscriber, but may be used to represent a subset of packet flows having a common characteristic, such as packet flows associated with a common multimedia session.

The use of session cookies to unique identify collections of session-specific packet flows may enable the service node to apply session-specific, stateful services to the encapsulated subscriber packet as part of an overall subscriber packet flow within the particular collection of packet flows without having to first inspect portions of the subscriber packet itself (e.g., the header or the payload of the subscriber packet) to identify the subscriber or to associate with subscriber packet with a given subscriber packet flow. In other words, the techniques described herein may effectively remove any burden on the service nodes to processes individual packets to identify per-session service requirements or local network state associated with the subscriber session.

In one example, a method includes receiving, by a network device of a service provider network, a subscriber packet of a packet flow sourced by a subscriber device and destined to a packet data network. The method includes forming a tunnel packet by encapsulating the subscriber packet within a payload of the tunnel packet and constructing a header of the tunnel packet for transport by a tunnel associated with a service chain. The service chain comprises an ordered set of one or more stateful services for application, by a set of service nodes, to packet flows from a plurality of subscriber devices. In addition, the method includes embedding, within the tunnel packet, a session cookie storing a value that uniquely identifies a collection of packet flows sourced by the subscriber device, and forwarding, by the network device, the tunnel packet toward the service nodes.

In another example, a device, such as a router or switch, comprises a plurality of network interfaces and a control unit including a processor executing a traffic engineering protocol to establish a tunnel for a service chain. The service chain comprises an ordered set of one or more stateful services for application, by a set of service nodes, to packet flows associated with the service chain. The device further includes a forwarding circuit programmed with forwarding information associated with the tunnel for forwarding the packet flows along the tunnel. In general, the forwarding circuit receives a subscriber packet of a packet flow sourced by a subscriber device and forms a tunnel packet in accordance with the forwarding information by encapsulating the subscriber packet within a payload of the tunnel packet and constructing a header of the tunnel packet. When forming the tunnel packet, the forwarding circuit embeds, within the tunnel packet, a session cookie storing a value that uniquely associates the packet flow with a collection of packet flows originating from the same subscriber and distinguishes the packet flow from other packet flows associated with the service chain that originated from other subscribers. Finally, the forwarding circuit outputs the tunnel packet to one of the network interface for forwarding toward the service nodes.

In a further example, a service node comprises a network interface to receive tunnel packets over a plurality of tunnels. Each of the tunnels correspond to a plurality of service chains, and each of the service chains comprises a different ordered set of one or more stateful services of packet flows associated with subscribers. Each of the tunnel packets encapsulates a subscriber packet and including a session cookie storing a value that uniquely associates the subscriber packet with a collection of packet flows originating from the same subscriber. The service node includes a processor executing network services software to apply one or more of the stateful network services to the packet flows. The network services software associates each of the subscriber packets with a corresponding one of the packet flows based on the value of the session cookie and the tunnel on which the tunnel packet was received without inspecting the subscriber packet.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

FIG. 3 illustrates a logical representation of example configuration data generated by an SDN controller or a gateway to specify the example service chains of FIG. 2.

DETAILED DESCRIPTION

Figure 1:
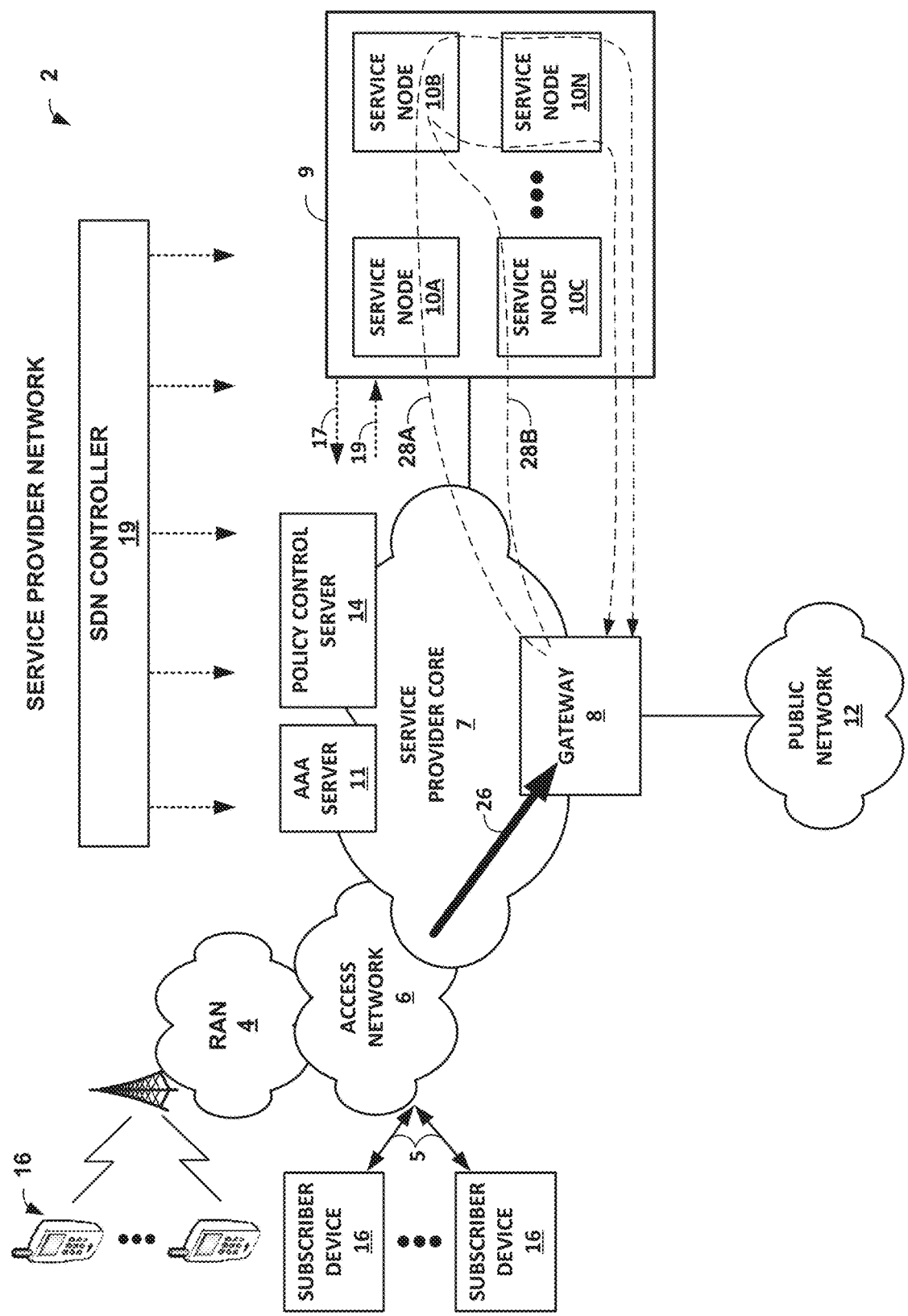
FIG. 1 is a block diagram illustrating an example network system operating in accordance with techniques described herein.

FIG. 1 illustrates an example network system in accordance with techniques described herein. The example network system of FIG. 1 includes a service provider network 2 that operates as a private network to provide packet-based network services to subscriber devices 16A-16N (collectively, "subscriber devices 16"). That is, service provider network 2 provides authentication and establishment of network access for subscriber devices 16 such that the subscriber device may begin exchanging data packets with public network 12, which may be an internal or external packet-based network such as the Internet.

In the example of FIG. 1, service provider network 2 comprises access network 6 ("access network 6") that provides connectivity to public network 12 via service provider core network 7 and gateway 8. Service provider core network 7 and public network 12 provide packet-based services that are available for request and use by subscriber devices subscriber devices 16. As examples, core network 7 and/or public network 12 may provide, for example, bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of PUBLIC NETWORK 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), 3rd Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16 attached to access network 6 for accessing public network 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent an edge network coupled to core network 7, e.g., by a customer edge device such as customer edge switch or router. Public network 12 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

A network service provider that administers at least parts of network 2 typically offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by public network 12, and such packets traverse gateway 8 as part of at least one packet flow. Flows 26 illustrated in FIG. 1 represent one or more upstream packet flows from any one or more subscriber devices 16 and directed to public network 12. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

As described herein, service provider network includes a services complex 9 having a cluster of service nodes 10A-10N that provide an execution environment for the network services. That is, each of service nodes 10 apply one or more services. As examples, service nodes 10 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of service nodes 10 in this way represents a service instance.

Although illustrated as part of a services complex 9, which may represent a data center, service nodes 10 may, for instance, be coupled by one or more switches or virtual switches of core network 7. In one example, each of service nodes 10 may run as virtual machines in virtual compute environment. Moreover, the compute environment may comprise a scalable cluster of general computing devices, such as x86 processor-based servers. As another example, service nodes 10 comprise a combination of general purpose computing devices and special purpose appliances. As virtualized, individual network services provided by service nodes 10 can scale just as in a modern data center, through the allocation of virtualized memory, processor utilization, storage and network policies, as well as horizontally by adding additional load-balanced virtual machines.

As shown in FIG. 1, gateway 8 steers individual subscriber packet flows 26 through defined sets of services provided by service nodes 10. That is, each subscriber packet flow may be forwarded through a particular ordered combination of services provided by service nodes 10, each ordered set being referred to herein as a "service chain." In the example of FIG. 1, one or more subscriber packet flows 26 are directed along a first service chain 28A and, therefore, receive services applied by service nodes 10A, 10B and 10N, in that order. Similarly, one or more subscriber packet flows 26 are directed along a second service chain 28B and, therefore, receive services applied by service nodes 10C, 10B and 10N.

In this way, subscriber flows 26 may be processed by service nodes 10 as the packets flow between access network 6 and public network 12 according to service chains configured by the service provider. In the illustrated example, service chain 28A identifies the ordered set of nodes 10A, 10B, and 10N according to the listed ordering. Service chain 28B identifies the ordered set of nodes 10C, 10B and 10N.

Accordingly, packet flows 26 processed according to service chain 28A follow a service path that traverses nodes 10A, 10B, and finally node 10N as the terminal node for the service chain 28A. A particular node 10 may support multiple service chains. In this example, service node 10B supports service chains 28A, 28B.

Once processed at a terminal node of the service chain, i.e., the last node 10 to apply services to packets flowing along a particular service path, the terminal node may direct the traffic back to gateway 8 for further processing and/or forwarding to public network 12. For example, traffic engineered service paths may start and terminate with gateway 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. The arrows denoted as service chains 28A, 28B illustrate respective paths taken by packet flows mapped to the service chains 28A or 28B. For example, a given subscriber may be associated with a particular service profile, which in turn is mapped to a service tunnel associated with service chain 28A. Similarly, another subscriber may be associated with a different service profile, which in turn is mapped to a service tunnel associated with service chain 28B. Gateway 8, after authenticating and establishing access sessions for the subscribers, directs packet flows for the subscribers along the appropriate service tunnels, thereby causing service complex 9 to apply the requisite ordered services for the given subscriber.

Nodes 10 may implement service chains 28A, 28B using internally configured forwarding state that directs packets of the packet flow long the service chains 28A, 28B for processing according to the identified set of service nodes 10. Such forwarding state may specify tunnel interfaces for tunneling between service nodes 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect connect service nodes 10 may be configured to direct packet flow to the service nodes 10 according to service chains 28A, 28B.

In FIG. 1, software-defined networking (SDN) controller 19 provides a high-level controller for configuring and managing routing and switching infrastructure of service provider network 2 (e.g., gateway 8, core network 7 and nodes 10). In some instances, SDN controller 19 manages deployment of virtual machines within the operating environment of value-added services complex 9. For example, SDN controller 19 may interact with gateway 8 to specify service chain 28A, 28B information. For example, the service chain information provided by SDN controller 19 may specify any combination and ordering of value-added services provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain 28A, 28B. Further example details of an SDN controller are described in PCT International Patent Application PCT/US13/44378, filed Jun. 5, 2013, the entire contents of which are incorporated herein by reference.

In accordance with techniques described herein, gateway 8 modifies packets of packet flows 26 as the gateway 8 steers the packets into appropriate service chains. For example, gateway 8 may prepend to each subscriber packet a traffic engineering header or label (e.g., an additional IP header or MPLS label) to form a "tunnel packet" in which the subscriber packet is encapsulated as a payload. At this time, gateway 8 selects the particular traffic engineering header based on the particular subscriber and, more specifically, selects the service chain to which the particular type of packet flow for the given subscriber is assigned. In other words, the processing of subscriber packet flows 26 by gateway 8 to steer the packet flows is session-aware (i.e., based on the particular subscriber from which the packet flow originated) and may also be based on characteristics of the packet flow itself, e.g., type of flow (e.g., VoIP, HTTP, etc).

As described herein, service provider network 2 utilizes session cookies to uniquely identify collections of session-specific packet flows steered through the service chains. A collection of packet flows uniquely identified by a given session cookie may represent, for example, of the packet flows originating for a subscriber session, such all flows originating from a subscriber's PPP or GTP access connection. Alternatively, a given session cookie need not represent all packet flows from the subscriber, but may be used to represent a subset of packet flows having a common characteristic. For example, the session cookie may represent packet flows associated with a common multimedia session of the subscriber or associated with web (HTTP) traffic of the subscriber or other particular protocols.

As explained, network nodes 10 utilize the session cookies to provide session-aware, stateful network services to packet flows associated with subscriber devices 16. Each session cookie contains a value that is unique to the particular service chain through which the collection of packet flows is being direction. In some examples, service nodes 10 utilize the unique value of the session cookie as an index into locally stored session state information and/or service requirements for the subscriber so as to quickly retrieve the particular state information associated with the collection of packet flows. In this way, the session cookies may effectively remove any burden on the service nodes to processes individual packets to identify service requirements or local network state associated with the packet flows of the subscriber sessions.

In operation, gateway 8 embeds a session cookie within each packet to reduce the burden on service nodes 10 with respect to subsequent processing of the subscriber packets. In one example, the gateway 8 embeds the session cookie in the form of an opaque session cookie between the traffic engineering header and the encapsulated subscriber packet. In this way, each packet carries an opaque session cookie, and the content of each session cookie uniquely identifies the respective collection of subscriber packet flows from other packet flows transported by the service tunnel. As such, when receiving tunnel packets, each service node 10 need only identify the service tunnel on which the tunnel packet was received and the session cookie embedded within the tunnel packet in order to uniquely associate the subscriber packet encapsulated therein with packet flows of a subscriber session. This may enable the service node 10 to apply subscriber-specific, stateful services, based on subscriber-specific requirements, to the encapsulated subscriber packet as part of a particular subscriber packet flow without having to first inspect portions of the subscriber packet (e.g., the header or the payload of the subscriber packet) to identify the subscriber.

As such, each individual service node 10 can leverage on the implicit service semantics associated with the particular tunnel on which a packet is received, and can readily create and maintain local session state for a subscriber session based on the session cookie, without having to re-classify each incoming packet nor re-authorize the corresponding session. This state information generated and maintained by service node 10 for each session can include local states for policy enforcement and application of network services, as well as local statistics, e.g. accounting data and (uniquely tagged) accounting records. Service nodes 10 may dynamically create new local states for use with a new collection of packet flows simply by virtue of detecting a previously unused session cookie. Similarly, service nodes 10 can more easily manage local states for packet flows by performing local actions, such as by aging state information for packet flows or detection of a particular packet/message for the subscriber packet flow, or some external interaction with SDN controller 19 or gateway 8.

Gateway 8 may dynamically construct the session cookies upon identifying new collections of packet flows to be steered through a particular service chain. As another example, gateway 8 may request and receive the session cookies from an external device, such as AAA server 11 upon authenticating a subscriber to service provider network 2.

In some implementations, individual service nodes 10 may optionally utilize the session cookies as a correlation mechanism for dynamically storing subscriber-specific information to and/or retrieving subscriber-specific information from other network elements of service provider network 2. For example, as shown in FIG. 1, any of service nodes 10 may issue queries 17 and receive responses 19 from other network elements, such as AAA server 11, policy control server 14 and/or SDN controller 19. In these examples, service nodes 10 include session cookies 10 within queries 17 as an efficient mechanism for storing information and optionally retrieving the information from other elements, where the session cookies allow the other elements to easily correlate the information with particular subscribers and related subscriber sessions without the individual service nodes having to process the packet flows, identify particular subscribers and provide this identification to the other network elements. In this way, the techniques described herein allow service nodes 10 to leverage the authorization process performed between gateway 8 and AAA server 11, thereby allowing for delegation of parts of session-aware service enforcement to service nodes 10 without requiring the service nodes to interact on a per session-basis with subscriber control systems.

In some example implementations, service nodes 10 may issue queries 17 to one or more elements of service provider 2 that operate as a central repository for subscriber-specific state information. That is, in this example, service nodes 10 utilize the session cookies as an efficient mechanism for storing and optionally retrieving subscriber-specific state information from a central repository. For example, one or more of service nodes 10 may issue queries 17 containing session cookies along with statistics and other relevant information, to accounting and charging systems, such as AAA server 11, thereby further leveraging the session cookies. In this example, AAA server 11, or a different network element, operates as a centralized accounting and logging system and stores data received from service nodes 10 based on the session cookies provided by the service nodes along with the data. This may be useful, for example, for storing accounting information, logs, and/or bulk statistics for subscribers devices 16, and the stored information can easily be correlated to particular subscribers using the session cookies allocated to the subscriber sessions upon original authentication of each subscriber.

As another example, one or more of service nodes 10 may issue queries to retrieve subscriber-specific service requirements from other elements of service provider network, such as SDN controller 19, AAA server 11, policy control server 14 or other subscriber control systems. For example, when processing packet flows, service nodes 10 may issue queries 17 to request subscriber-specific service requirements 19 based on the unique session cookies. Examples of subscriber-specific service requirements returned by SDN controller 19 or AAA server 11 include policies, service level agreement parameters, information describing the services to be applied for a particular subscriber, and the like.

As a specific example, one or more of service nodes 10 may implement policy and charging control (PCC) functionality for subscriber devices 10. In response to queries 17 issued by any of service nodes 10, policy control server 14 issues responses 19 to provision the requesting service node by a policy interface with one or more policy rules that each specifies a set of information enabling the detection of a service data flow and defining policy control, charging, or application detection parameters for application by network elements of access network 6. Policy control server 14 may provision one or more service nodes 10 with a Policy Control and Charging Rules Function (PCRF) for a mobile (e.g., 3GPP) subscriber devices or, alternatively or in addition, for a broadband/wireline subscriber devices.

One or more of subscriber nodes 10 may, for example, provide an operating environment for a policy enforcement module that enforces subscriber-based policy and charging control according to the policy rules. In some examples, the policy interface presented by a service node 10 may represent a Gx and/or Sd interface/reference point provided by one or more service nodes. In some instances, the policy rules provided by policy control server 14 to gateway 8 include PCC rules and the policy enforcement module(s) executing on service nodes 10 represents a Policy and Charging Enforcement Function (PCEF). In some instances, the policy rules may also or alternatively include Application Detection and Control (ADC) rules and the policy enforcement module implemented by one or more service nodes may represents a Traffic Detection Function (TDF). In some instances, the policy enforcement module(s) of service nodes 10 may represent a Policy Decision Point for a BPCF framework. Further details regarding policy and charging controls are found in "3GPP TS 23.203—Policy and Charging Control Architecture (Release 10)," Version 10.1.0, 3rd Generation Partnership Project, Technical Specification Group Services and System Aspects, September 2010; and 3GPP TS 29.212—Policy and Charging Control (PCC), Reference Points (Release 11)," Version 11.7.0, February 2012; which are each incorporated herein by reference in their entirety.

The session cookies within service provider network 2 may also provide an elegant mechanism for a load balancer to load balance collections of packet flows across service nodes 10. For example, the load balancer need only apply a hash or other deterministic operation to the session cookies embedded within the tunnel packets so as to ensure that the entire collection of packet flows to the same service node while load balancing multiple collections (sessions) across different service nodes.

In general, the term stateful network services means network services in which the processing of a given packet in a packet flow may be dependent upon the processing of previous packets for that packet flow, and may create state used when processing subsequent packets for the packet flow. In some cases, application of the networks services may result in modification of the subscriber packets, such as NAT or application proxy services, and use of the session cookies allow downstream service nodes to nevertheless efficiently resolve the subscriber packet flows to subscriber-specific requirements. Other examples of network services may not necessarily result in modification of the subscriber packets, such as accounting, charging, and load balancing services. The session cookies embedded within the tunnel packets may be referred to herein as "opaque" in that network infrastructure coupling service nodes 10 to gateway 8, along with any legacy ones of service nodes 10 that do not support the use of the session cookies, may ignore and generally be unaffected by the inclusion of the additional information within each tunnel packet output by gateway 8. Moreover, although described with respect to gateway 8 as an example, the techniques described herein with respect to directly packet flows to service complex 9 for subscriber-specific services may be implemented by other network devices, such as any router, switch or other component or device.

Figure 2:
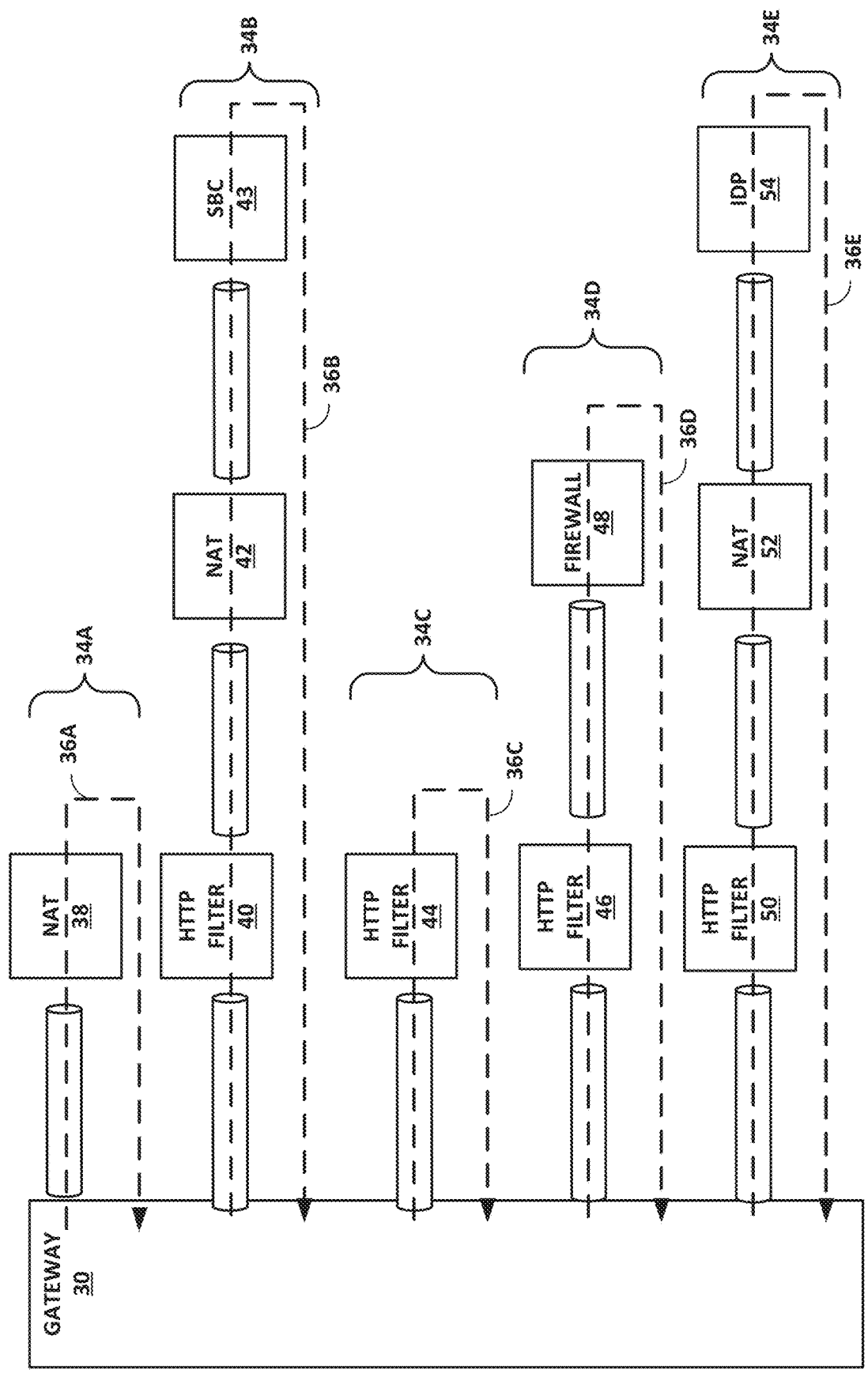
FIG. 2 is a block diagram illustrating an example set of service chains supported by an example controller.

FIG. 2 is a block diagram illustrating an example set of service chains supported by an example controller. In particular, FIG. 2 illustrates a set of service chains 34A-34E supported by gateway 30. Gateway 30 may, in one example, represent gateway 8 of FIG. 1 such that service chains 34 represent an example set of service chains 28 provided by service nodes 10.

In this example, one or more subscriber packet flows 36A are directed along a first service chain 34A to receive network address translation (NAT) service 38. Similarly, one or more subscriber packet flows 36B are directed along a second service chain 34B for application of an HTTP filter service 40, NAT service 42 and session border controller (SBC) services 43 for voice over IP (VoIP) processing and control. In service chain 34C, packet flows 36C are directed only to HTTP filter service 44. In service chain 34D, packet flows 36D are directed to HTTP filter 46 and subsequently to firewall service 48. As another example, packet flows 36E are directed along service chain 34E for application of HTTP filter 50, NAT 52 and intrusion detection and prevention (e.g., deep packet inspection) service 54.

Figure 3:
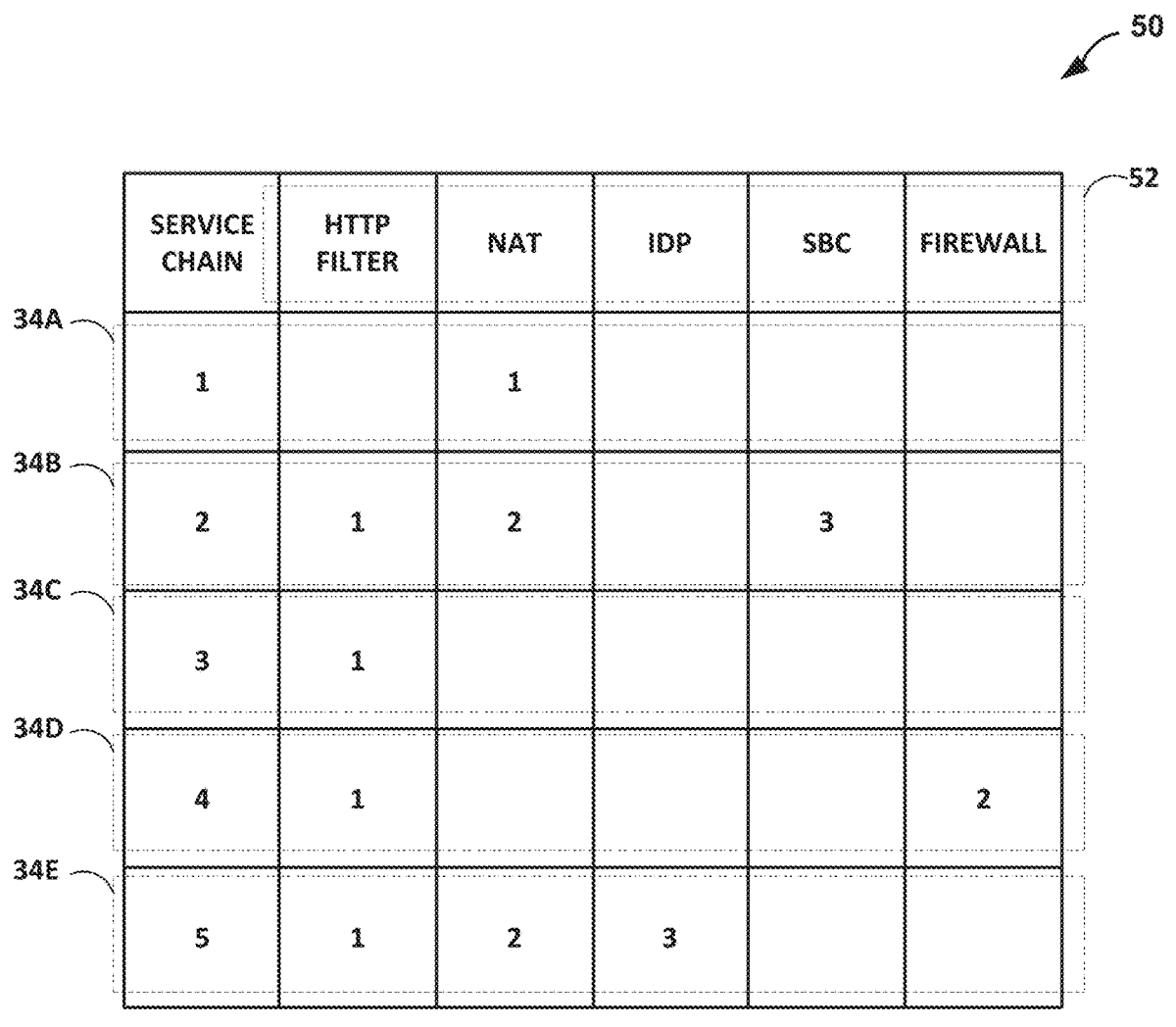

FIG. 3 illustrates a logical representation of example configuration data 50 generated by an SDN controller (e.g., SDN controller 19) or a gateway (e.g., gateways 8 or 30 of FIG. 1 or 2) in specifying the example service chains 34 of FIGS. 2-3. Configuration data 50 may take the form of a table, database, array or other data structure, and input indicative thereof so as to define the ordered set of network services for each service chain may be provided by a text-based command line interface, controller, network management system or the like.

As shown in FIG. 3, configuration data 50 generated by the SDN controller or the gateway includes entries defining each of the five service chains 34A-34E of FIG. 2. In addition, data 50 defines a set of services 52 that are available by the service nodes, such as service nodes 10 of service complex 9 of FIG. 1.

For each of service nodes 34, data 50 specifies which of services 52 are to be applied and in which order. For example, data 50 defines first service chain 34A as having a service chain identifier '1' and as requiring only NAT service. As another example, data 50 defines second service chain 34B as having a service chain identifier '2' and as requiring application of an HTTP filter service, NAT service and an SBC service, in that order. Similarly, data 50 defines the ordered set of services 52 for service chains 34C-34E. In this way, each record within data 50 defines the ordered services to be applied for a corresponding service chain.

Based on the specification of the service chains, a device, such as a router or SDN controller, executing traffic engineering protocols determines the necessary traffic engineering information necessary to establish service tunnels for transporting encapsulated subscriber packets between service nodes. For example, the router or SDN controller may perform path computation and issue path setup messages and/or distribute labels or other header information to be used at each hop along each service path. Example details of an SDN controller capable of performing path computation and distributing labels to network elements are described in U.S. patent application Ser. No. 13/842,453, filed Mar. 15, 2013, entitled "AGGREGATION NETWORK WITH CENTRALIZED CONTROL," the entire content of which is incorporated herein by reference.

Figure 4:
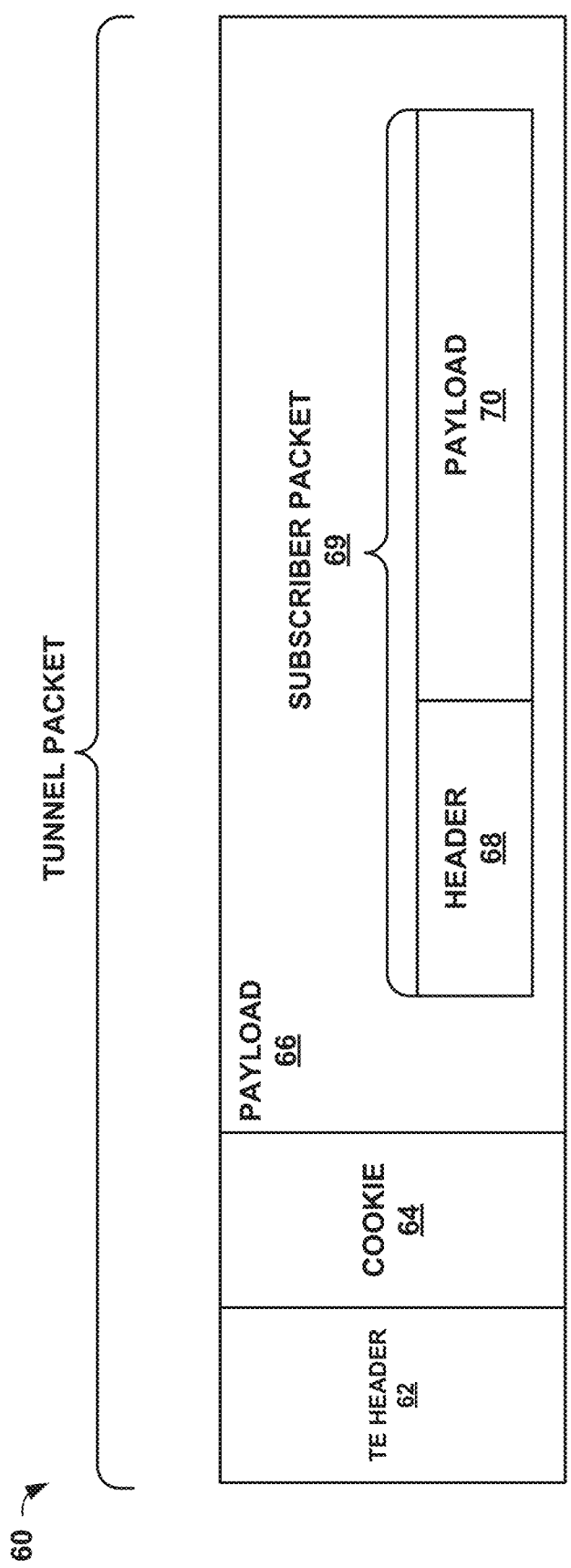
FIG. 4 illustrates an example tunneled packet output by a gateway or other device to steer packets along particular service chains

FIG. 4 illustrates an example tunneled packet 60 output by a gateway or other device to steer a subscriber packet along particular service chains. In the example of FIG. 4, an original subscriber packet 69 having header 68 and payload 70 is encapsulated within payload 66 of tunnel packet 60. Moreover, as shown in this example, tunnel packet 60 includes a traffic engineering (TE) header 62, such as an IP header or MPLS label associated with a particular service path, and an additional session cookie 64.

Session cookie 64 is a field of tunnel packet 60 storing a value that uniquely identifies the packet flow (e.g., user data session) amongst several different packet flows associated with a service chain. In some examples, session cookie 64 may be a 64-bit field. Session cookie 64 specifies a value that is unique with respect to a given service chain and is attached to every packet for the collection of packet flows corresponding to the session cookie. In the example of FIG. 4, tunneled packet 60 is formed so as to include session cookie 64 embedded between TE header 62 and payload 66. That is, session cookie 64 is not part of the payload 66, and a service node need not inspect subscriber packet 69 contained within payload 66 to identify the value specified by session cookie 64 so as to associate the subscriber packet with a collection of packet flows. Although shown separately from TE header 62, session cookie 64 may, in some examples, be considered part of a header prepended to payload 66 of tunnel packet 60. In any case, session cookie 64 is external to subscriber packet 69 and service nodes need not inspect the subscriber packet for associating the subscriber packet with a packet flow sourced by the subscriber.

As described herein, the contents of session cookie 64 inserted by the gateway allow service nodes along the service path to associate the subscriber packet with a unique, corresponding packet flow for a subscriber session for that service path. As such, when receiving tunnel packet 60, each service node 10 along the service path need only identify the service tunnel on which tunneled packet 60 was received and the session cookie 64 embedded within the packet in order to uniquely associate the packet with a subscriber session. Otherwise stated, each node may provide stateful services to separate packet flows by treating tunnel packets from the same service tunnel and having the same session cookie as carrying packets for the same packet flow. This may enable the service node to apply subscriber-specific, stateful services to the encapsulated subscriber packet as part of a particular subscriber packet flow for a given subscriber without having to first processes portions of the subscriber packet itself (e.g., header 68 or payload 70) associate the subscriber packet with a given subscriber session.

Figure 5:
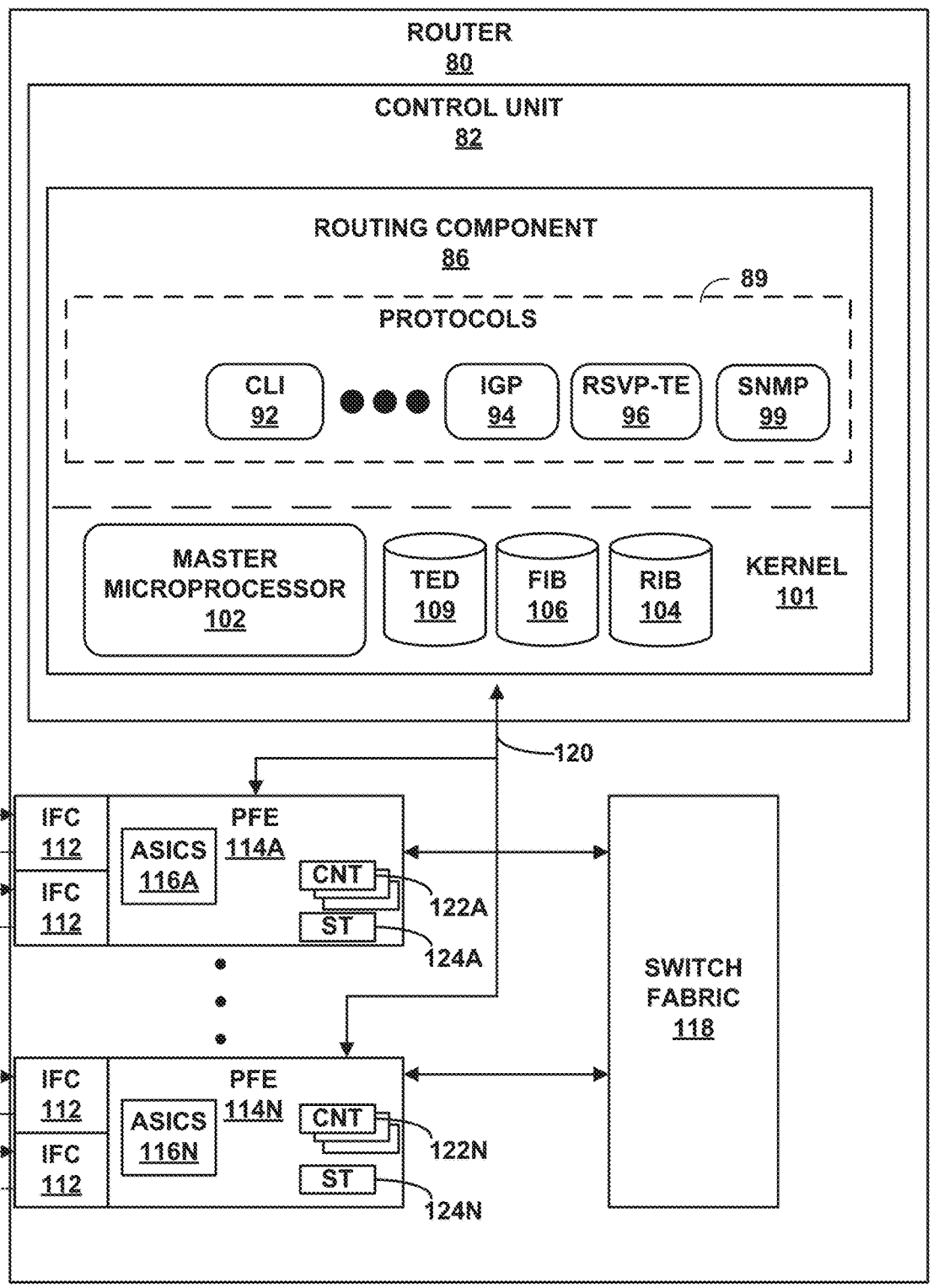
FIG. 5 is a block diagram illustrating an exemplary device, e.g., a router or gateway, capable of implementing the techniques described herein.

FIG. 5 is a block diagram illustrating an exemplary device, e.g., a router or gateway, capable of implementing the techniques described herein. Router 80 may comprise any router in a network, such as SP network 2. For example, router 80 may comprise a gateway, an edge router, a core router or other device illustrated in FIGS. 1-2 that directs packet flows to a service complex for application of network services.

In the example of FIG. 5, router 80 includes control unit 82 in which routing component 86 provides control plane functionality for router 80. Router 80 also includes a plurality of packet-forwarding engines 114A-114N ("PFEs 114") and a switch fabric 118 that collectively provide a data plane for forwarding network traffic. PFEs 114 receive and send data packets via interface cards 112 ("IFCs 112"). In other embodiments, each of PFEs 114 may comprise more or fewer IFCs. Although not shown, PFEs 114 may each comprise a central processing unit (CPU) and a memory. In this example, routing component 86 is connected to each of PFEs 114 by a dedicated internal communication link 120. For example, dedicated link 34 may comprise a Gigabit Ethernet connection. Switch fabric 118 provides a high-speed interconnect for forwarding incoming data packets between PFEs 114 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of router 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of router 80 using text-based commands. Simple Network Management Protocol daemon 99 ("SNMP 99") comprises an SNMP agent that receives SNMP commands from a management entity to set and retrieve configuration and management information for router 80. Using CLI 92 and SNMP 99, management entities may enable/disable and configure services, install routes, enable/disable and configure rate limiters, and configure interfaces, for example.

One or more routing protocols, such as IGP 94, maintains routing information in the form of routing information base (RIB) 104 that describes a topology of a network, and derives a forwarding information base (FIB) 106 in accordance with the routing information. In general, the routing information represents the overall topology of the network. IGP 94 interacts with kernel 101 (e.g., by way of API calls) to update RIB 104 based on routing protocol messages received by router 80. RIB 104 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 106 is generated based on selection of certain routes within the network and maps packet key information (e.g., destination information and other select information from a packet header) to one or more specific next hops and ultimately to one or more specific output interface ports of IFCs 112. Routing component 86 may generate the FIB in the form of a radix tree having leaf nodes that represent destinations within the network. Details on an example embodiment of a router that utilizes a radix tree for route resolution are provided in U.S. Pat. No. 7,184,437, the contents of which being incorporated herein by reference in its entirety.

Routing component 86 also provides an operating environment of one or more traffic engineering protocols to establish tunnels for forwarding subscriber packets through the ordered set of service nodes associated with different service chains. For example, RSVP-TE 96 may execute the Resource Reservation Protocol with Traffic Engineering extensions to exchange traffic engineering (TE) information, such as MPLS labels for enabling label-based packet forwarding. As another example, routing component 86 may use GRE or IP-based tunneling protocols to establish traffic engineered tunnels. Routing component 86 may maintain, for example, a traffic engineering database (TED) 109 to store the traffic engineering data.

Routing component 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of router 80. In some instances, routing component 86 may derive separate and different software FIBs for each respective PFEs 114. In addition, one or more of PFEs 114 include application-specific integrated circuits (ASICs 116) that PFEs 114 program with a hardware-copy of the FIB based on the software FIBs (i.e., hardware versions of the software FIBs) copied to each respective PFE 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 96 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of interface cards associated with respective PFEs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PFEs 114 to install copies of the FIB 106. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 116 are microcode-controlled chipsets (i.e., forwarding circuits) programmably configured by a slave microprocessor executing on each of PFEs 114. When forwarding packets, control logic with each ASIC 116 traverses the forwarding information (FIB 106) received from routing component 86 and, upon reaching a FIB entry for the packet (e.g., a leaf node), microcode-implemented control logic 56 automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of router 80. Operations may be performed, for example, on each packet based on any of a corresponding ingress interface, an ingress PFE 114, an egress PFE 30, an egress interface or other components of router 80 to which the packet is directed prior to egress, such as one or more service cards. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the manner in which a packet is forwarded or otherwise processed by PFEs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate subscriber packets in accordance with the forwarding information. In this way, ASICs 116 may process subscriber packets to select particular service paths for each packet and encapsulate the subscriber packets in accordance with the selected service paths. Routing component 86 may generate RIB 104 and FIB 106 to associate subscriber packet flows with particular service paths based on one or mores service profiles associated with each subscriber, as may be received from an Authentication, Authorization and Accounting (AAA) server, a policy controller, SDN controller or other network element.

In accordance with the techniques described herein, when detecting new packet flows and assigning the packet flows to correspondence service chains, PFEs 114 assigns a value to the flow that uniquely identifies the flow from other flows assigned to the same service chain, even if those flows originate from the same subscriber or different subscribers. When processing packets for the flow, PFEs 114 embeds additional information in the form of an opaque session cookie between the traffic engineering header and the encapsulated subscriber packet, where the session cookie carries the value assigned to the flow. In this way, each tunnel packet output by PFEs carries an opaque session cookie, and the contents of each session cookie is unique to a subscriber session for a given service tunnel.

For example, in an example implementation, PFEs 114 may be programmed to maintain a respective one of session tables ("ST") 124A-124N ("session tables 124") and a plurality of counters ("CNT") 122A-122N ("counters 122"), each respective counter 122 corresponding to a different service chain. In operation, ASICs 116 update session tables 124 to record detection of new subscriber sessions. ASICs 116 may, for example, perform packet inspection and update session tables 124 with session information for each newly detected subscriber session. Upon assigning a collection of packet flows for a subscriber to a particular service tunnel, ASICs 116 record the session information and service path for each session. In addition, ASICs 116 may update counters 122 as the subscriber sessions are assigned to service tunnels to generate, for each session, a session cookie value that uniquely identifies the collect of packet flows of the session amongst other flows assigned to the same service tunnel. To ensure uniqueness of session cookie values across PFEs 114 for packet flows traversing the same service chain, counters 122 for different PFEs 114 may be assigned different ordinal domains, or counters 122 and session tables 124 may be synchronized or centrally maintained within router 80, e.g., by routing component 86. In one example, counters 122 are 64-bit counters that are incremented for each newly detected subscriber session having packet flows assigned to a given service tunnel. As such, session cookie values inserted within each tunnel packet are 64-bit values and allow downstream service nodes to apply stateful services and otherwise perform the techniques described herein by treating tunnel packets from the same service tunnel and having the same session cookie value as associated with a single subscriber session.

The architecture of router 80 illustrated in FIG. 5 is shown for example purposes only. This disclosure is not limited to this architecture. In other examples, router 80 may be configured in a variety of ways. In one example, some of the functionally of control unit 82 may be distributed within IFCs 34. Control unit 82 may be implemented solely in software, or hardware, or may be implemented as a combination of software, hardware, or firmware. For example, control unit 82 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 6:
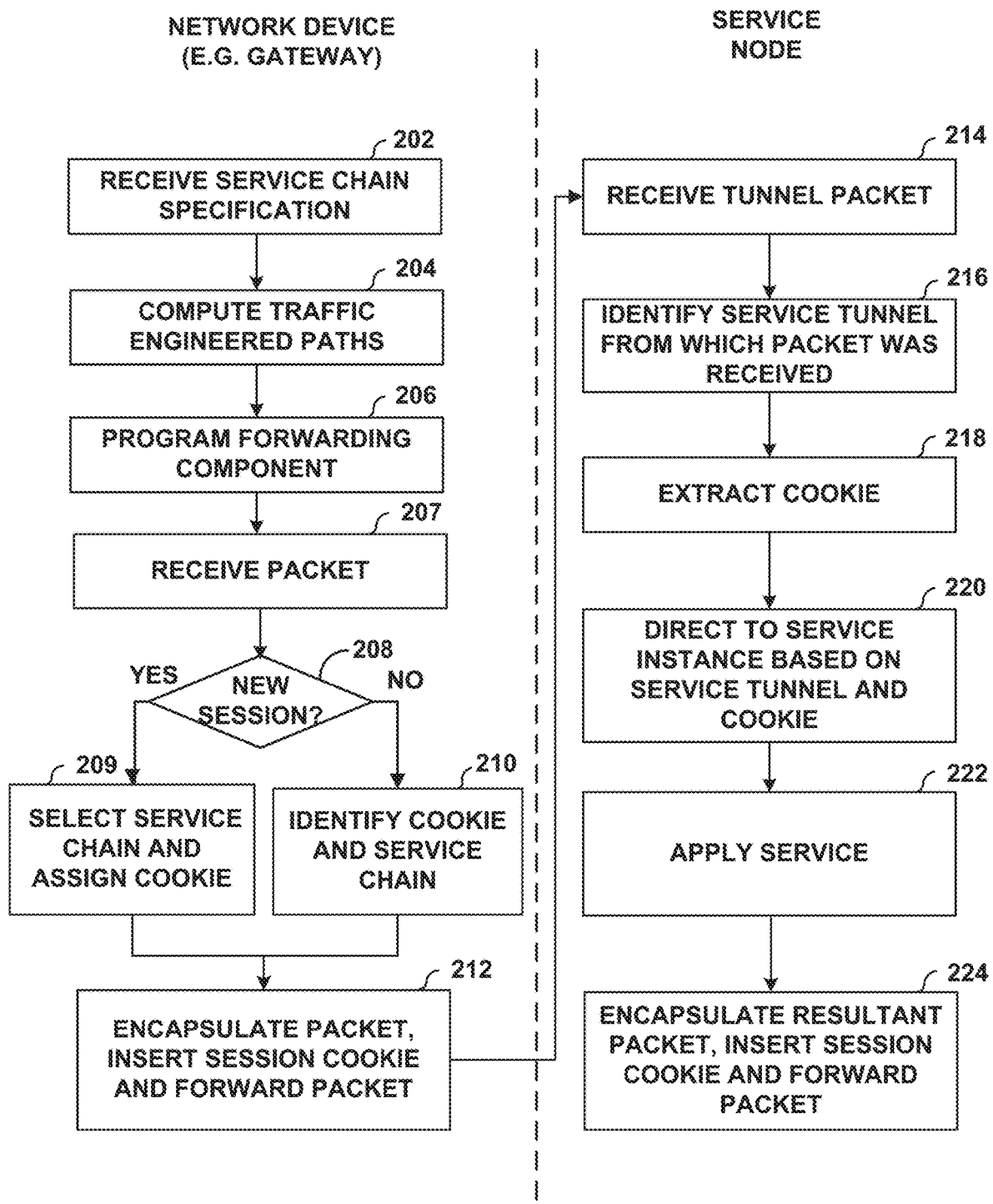
FIG. 6 is a flowchart illustrating exemplary operation of a router in accordance with the techniques described herein.

FIG. 6 is a flowchart illustrating exemplary operation of a network device, such as any gateway illustrated in FIGS. 1-2, 5. As shown in FIG. 6, the gateway router initially receives a service chain specification that defines the number of service chains and the ordered services to be with respect to each chain (202). For example, the gateway router may receive the service chain specification by way of an API presented to, and invoked by, an SDN controller. As another example, the gateway router may receive the service chain specification via a CLI or SNMP interface. The service chain specification may further specify, for each service, network address information (e.g., IP addresses) or identifying information for each service node, which may be a virtual or physical machine or other service instance.

The gateway router processes the service chain specification to compute, in view of topology information maintained by the router, forwarding information for a corresponding service path for each service chain (204). The forwarding information may include, for example, tunnel header information to be applied with encapsulating subscriber packets for the different service chains. The gateway router may distribute the forwarding information to the service nodes to control forwarding at each hop along the service path. Alternatively, an SDN controller or other path computation element may compute and distribute forwarding information for the service paths to the gateway router and the service nodes.

The gateway router programs a packet forwarding component within the gateway router with forwarding structures associated with each service chain (206). For example, as described above, a routing component of the gateway router may program forwarding ASICs with forwarding information that specifies traffic engineering information, such as IP header information or MPLS labels, as well as operations for causing programmable the to encapsulate subscriber packets in accordance with the forwarding information.

In operation, the gateway router receives subscriber packets (207) and determines whether the packet represents a new subscriber session (208). This may take the form of detecting a session request message or other communication indicative of a new session. As another example, the gateway router may detect that the particular flow from an existing subscriber is initiating a new collection of flows, such as a new multimedia session. The granularity of this operation may be configurable and controllable by, for example, an SDN controller. In some examples, the collection of flows for a subscriber session may constitute a single packet flow.

In the event the packet represents a packet flow of a new session, the gateway router determines a session cookie that uniquely identifies the session within a service chain to be applied to the new flow (209). For example, the router may authenticates new subscribers to a AAA server, e.g., by way of the Radius or Diameter protocols, and, at this time, receives a service profile or other information that defines the services to be applied to the subscriber or maps the various traffic expected for the subscriber to one or more service flows. Upon detecting a new flow, the gateway router selects the service chain for the flow based on the service profile and traffic type. For example, the gateway router selects one of the service chains for the packet based on the service profile received for the subscriber and/or based on the type of traffic, e.g., HTTP traffic or VoIP traffic. The gateway router assigns to the packet flow a session cookie having a value that uniquely identifies the flow from other flows assigned to the same service chain, even if those flows originate from the same subscriber or different subscribers.

The forwarding component of the gateway router processes the subscriber packet to encapsulate the packet and form a tunnel packet (212). At this time, the forwarding component embeds the session cookie between the traffic engineering header and the encapsulated subscriber packet, where the session cookie carries the value assigned to the flow. The router then forwards the tunnel packet containing the session cookie to the service complex.

Upon receiving a tunnel packet (214), a service node identifies the service tunnel on which the packet was received (216). For example, this may be determined based on the tunnel header of packet in view of the input interface on which the tunnel packet was received. In addition, the service node extracts the session cookie that is embedded in the tunnel packet, e.g., between the header and payload of the tunnel packet or as part of the header itself (218). Based on the service tunnel on which the packet was received and the value carried by the session cookie, the service node is able to associate the subscriber packet with a subscriber session and directs the subscriber packet, once decapsulated, to a service instance for application of stateful services in accordance with the service terms and requirements for the particular subscriber (222). In this way, the service node is able to apply stateful services to the subscriber packet by treating tunnel packets, and subscriber packets encapsulated therein, from the same service tunnel and having the same session cookie value as relating to a single subscriber session, without requiring inspection of the payload (subscriber packet) of the tunnel packet. For example, the service node may utilize the session cookie as key (e.g., index or offset) to retrieve session state information for the collection of packet flows (i.e., subscriber session) from a local repository of session state information and apply the stateful services to the subscriber packet in accordance with the session state information. As another example, the service node may issue a query to a policy controller or other network elements. The query includes the session cookie and may be used to retrieve, from the policy controller, one or more session-specific policies to be applied to the subscriber packet.

After application of stateful services to the subscriber packet, the service node forwards any resultant subscriber packet along the service chain to either the next service node along the service chain or to the gateway (224). In some cases, application of the stateful services to the subscriber packet may result in the packet being dropped (e.g., due to firewall services) or modified (e.g., such as NAT). The service node forms an outbound tunnel packet by encapsulating the resultant packet, inserting the session cookie that uniquely identifies the packet flow, and forwards the tunnel packet. For example, network services software of the service node encapsulates the resultant subscriber packets to form outbound tunnel packets and forwards the outbound tunnel packets to other service nodes along the service chains. At this time, the network services software embeds in each of the outbound tunnel packet the session cookie from the respective subscriber packet without modifying the value of the session cookie. In this way, downstream service nodes are able to associate packet flows with the same subscriber session corresponding to the cookie.

Although generally described by way of example with respect to outbound subscriber packets, the techniques of this disclosure may similarly be applied to inbound packets destined for the subscriber devices. In other words, the gateway or other device may similarly steer inbound packets through service chains (e.g., to apply reverse NAT, firewall services and the like) prior to delivery of the inbound packets to the subscriber devices.

Figure 7:
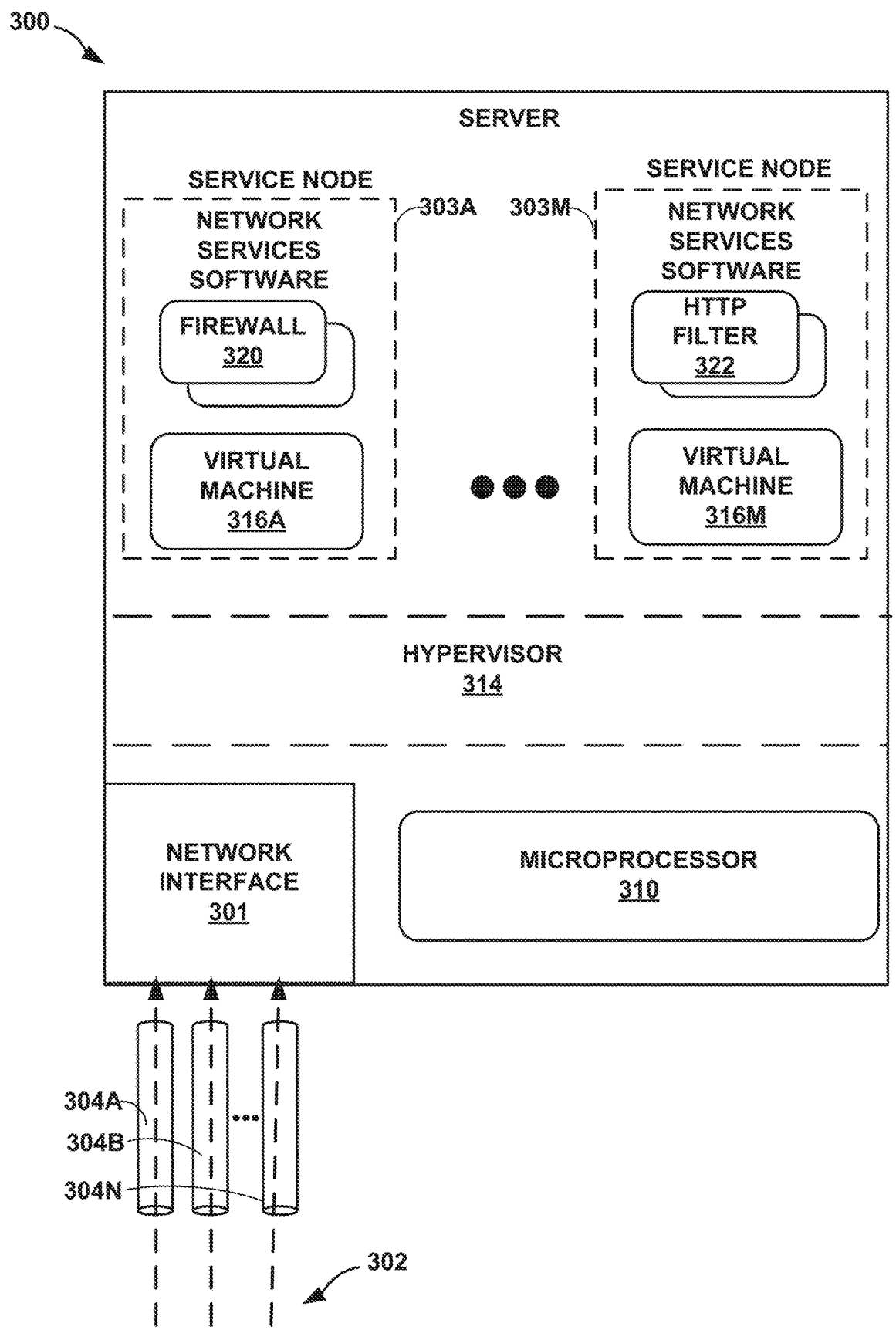
FIG. 7 is a block diagram illustrating an example server that provides an operating environment for one or more service nodes.

FIG. 7 is a block diagram illustrating an example server 300 that provides an operating environment for one or more service nodes 303A-303M ("service nodes 303"). In this example, server 300 includes a network interface 301 to receive tunnel packets 302 over a plurality of tunnels 304A-304N ("tunnels 304"). Each of the tunnels 304 corresponds to different one of a plurality of service chains, where each of the service chains comprises a different ordered set of one or more stateful network services to be applied to packet flows associated with subscribers. Each of the tunnel packets 302 encapsulates a subscriber packet and including a session cookie storing a value that uniquely associates the subscriber packet with a collection of the packet flows for a subscriber flowing through a given one of tunnels 304.

In the example of FIG. 7, server 300 includes a microprocessor 310 executing hypervisor 314 to provide an execution environment for one or more virtual machines 316A-316M that provide termination points for tunnels 304. Each of the virtual machines execute network services software, such as firewall instance 320 and HTTP filter instance 322, to apply one or more of the stateful network services to the packet flows. The network services software executing on virtual machines 316 is able to easily associate each of the subscriber packets transported via tunnel packets with a corresponding subscriber packet flow based on the value of the session cookie and the tunnel 304 that transported the tunnel packet without inspecting the subscriber packets.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    forming a tunnel packet by encapsulating a packet within a payload of the tunnel packet and constructing a header of the tunnel packet for transport by a tunnel associated with a particular service chain,
        wherein the service chain comprises an ordered set of one or more stateful services for application, by a set of service nodes, to a plurality of packet flows,
        wherein forming the tunnel packet comprises embedding a cookie within the tunnel packet, and
        wherein the cookie includes a value that uniquely identifies a specific subset of packet flows of the plurality of packet flows transported by the service tunnel for the service chain; and
    forwarding the tunnel packet toward the service nodes.

2. The method of claim 1, wherein the packet is sourced by a subscriber device and destined to a packet data network, the method further comprising:
    receiving, by a network device of a service provider network, the packet;
    determining whether the packet comprises a first packet of a new packet flow associated with a new subscriber session; and
    responsive to determining that the packet comprises a first packet of a new packet flow, assigning the value to the session cookie to uniquely identify the new packet flow of the new subscriber session amongst other packet flows of the plurality of packet flows.

3. The method of claim 2, wherein assigning the value of the session cookie comprises:
    updating a counter associated with the service chain upon detecting that the packet comprises a first packet of a new packet flow; and setting the value of the cookie based on the updated counter.

4. The method of claim 1, further comprising:
processing the packet to associate the packet with a service profile associated with a subscriber;
selecting, by the network device and based at least in part on the service profile for the subscriber, the service chain from a plurality of service chains, wherein each of the plurality of service chains comprises a different ordered set of one or more stateful services for application to packet flows associated with the respective service chain, and wherein each of the service chains is associated with a different one of a plurality of tunnels; and
assigning the packet to the service chain upon selecting the service chain.

5. The method of claim 1, further comprising:
receiving, with one of the service nodes, the tunnel packet;
based on the value of the cookie embedded within the tunnel packet and the tunnel on which the tunnel packet was received by the service node, associating the packet encapsulated within the tunnel packet with the particular subset of packet flows; and
applying, with the service node, one or more of the stateful services to the packet encapsulated within the tunnel packet by extracting and processing the packet in association with other packets of the particular subset of the packet flows.

6. The method of claim 5, wherein associating the packet encapsulated within the tunnel packet with the particular subset of packet flows comprises associating the packet encapsulated within the tunnel packet with the particular subset of packet flows based on the value within the cookie and the tunnel on which the tunnel packet was received without inspecting the packet encapsulated within the tunnel packet.

7. The method of claim 5, wherein applying, with the service node, one or more of the stateful services to the packet encapsulated within the tunnel packet comprises:
using the cookie as key to retrieve session state information for the particular subset of packet flows from a local repository of session state information; and
applying the stateful services to the subscriber packet in accordance with the session state information.

8. The method of claim 5, wherein applying, with the service node, one or more of the stateful services to the packet encapsulated within the tunnel packet comprises:
issuing a query from the service node to a policy controller;
receiving, from the policy controller, a response to the query, wherein the response includes one or more session-specific policies; and
applying the one or more subscriber-specific policies to the packet.

9. The method of claim 5, wherein applying, with the service node, one or more of the stateful services to the packet encapsulated within the tunnel packet comprises issuing a query from the service node to output statistics to an accounting system.

10. The method of claim 5,
encapsulating any resulting subscriber packet from application of the network services to form an outbound tunnel packet;
embedding, in the outbound tunnel packet, the cookie without modifying the value of the session cookie; and
forwarding the outbound tunnel packets to a second service node along the service chain.

11. The method of claim 5, wherein applying, with the service node, one or more of the stateful services to the subscriber packet comprise applying at least one of a Hyper-Text Transport Protocol (HTTP) filtering service, a proxy service, firewall service, a network address translation (NAT) service, a deep packet intrusion detection and prevention (IDP) service, a voice over IP (VoIP) service a video over IP service and a load balancing service.

12. The method of claim 11, wherein receiving configuration data comprises receiving the configuration data from a software defined network (SDN) controller.

13. The method of claim 11, wherein receiving configuration data comprises receiving the configuration data from an administrator.

14. The method of claim 1, further comprising receiving configuration data specifying the service chain and defining the ordered set of the one or more stateful services for application to packet flows associated with the service chain.

15. The method of claim 1, wherein the method is performed by a router or a switch.

16. The method of claim 1, further comprising:
authenticating a subscriber device; and
receiving the cookie from a network device upon authenticating the subscriber device.

17. The method of claim 1, further comprising applying a load balancing operation using the cookie to deterministically dispatch the packet to one of two or more of service nodes that provide instances of the same stateful service for the service chain.

18. A device comprising:
a plurality of network interfaces;
a control unit comprising a processor executing a traffic engineering protocol to establish a tunnel for a service chain, wherein the service chain comprises an ordered set of one or more stateful services for application, by a set of service nodes, to packet flows associated with the service chain;
a forwarding circuit configured with forwarding information associated with the tunnel for forwarding the packet flows along the tunnel,
wherein the forwarding circuit is configured to form a tunnel packet by encapsulating a packet within a payload of the tunnel packet and constructing a header of the tunnel packet for transport by the tunnel associated with the service chain,
wherein the forwarding circuit is configured to form the tunnel packet to include a cookie within the tunnel packet,
wherein the cookie includes a value that uniquely identifies a specific subset of packet flows of the plurality of packet flows transported by the service tunnel for the service chain, and
wherein the forwarding circuit is configured to forward the tunnel packet toward the service nodes.

19. The device of claim 18, wherein the device comprises a router or a switch.

20. A service node comprising:
a network interface to receive tunnel packets over a plurality of tunnels, wherein each of the tunnels corresponds to respective one of a plurality of service chains, each of the service chains comprising a different ordered set of one or more stateful services of packet flows associated with subscribers, and each of the tunnel packets having a header and a payload that encapsulates an inner packet, wherein each of the tunnel packets includes a cookie, and wherein the cookie stores a value that uniquely identifies a particular subset of a plurality of packet flows transported by the service tunnel for the service chain;

a hardware-based processor executing network services software configured to associate each of the inner packets with the particular subset of the packet flows based on the value of the cookie without inspecting the inner packet and to apply one or more of the stateful network services to the inner packets using state information for the particular subset of the packet flows.

21. The service node of claim 20, wherein the stateful services applied by the network services software to the subscriber packets comprise one or more of an HyperText Transport Protocol (HTTP) filtering service, a proxy service, firewall service, a network address translation (NAT) service, a deep packet intrusion detection and prevention (IDP) service, a voice over IP (VoIP) service a video over IP service and a load balancing service.

22. The service node of claim 20, wherein the service node is dedicated, special-purpose network appliance or a component of a router or switch.

\* \* \* \* \*